Jan. 19, 1926.　　　　　　　　　　　　　　1,570,566
C. H. HANSON
BEARING CONSTRUCTION
Filed March 31, 1921　　　2 Sheets-Sheet 1

INVENTOR
Clinton H. Hanson,
By Bates & Macklin
Att'ys

Jan. 19, 1926.

C. H. HANSON 1,570,566

BEARING CONSTRUCTION

Filed March 31, 1921   2 Sheets-Sheet 2

INVENTOR
Clinton H. Hanson,
BY Bates & Macklin
ATTORNEYS

Patented Jan. 19, 1926.

1,570,566

UNITED STATES PATENT OFFICE.

CLINTON H. HANSON, OF CHICAGO, ILLINOIS, ASSIGNOR TO MOTOR PLAYER CORPORATION, A CORPORATION OF ILLINOIS.

BEARING CONSTRUCTION.

Application filed March 31, 1921. Serial No. 457,339.

*To all whom it may concern:*

Be it known that I, CLINTON H. HANSON, a citizen of the United States, residing at Chicago, in the county of Cook and State of Illinois, have invented a certain new and useful Improvement in Bearing Construction, of which the following is a full, clear, and exact description, reference being had to the accompanying drawings.

This invention relates to anti-friction bearings, commonly known as "ball" bearings, and is particularly concerned with the method of mounting and lubricating such bearings adapted for very high speed.

In Patent No. 1,320,224 to G. W. Garman, issued October 28, 1919, is shown a suction producing apparatus for operating player pianos. In this suction producing apparatus, the armature of a small motor is mounted vertically and carries directly the fan elements. The use of such a device requires very high speed of the fans and the elimination of friction and vibration and other causes of noise. This device affords an example of the use of the present invention.

One of the objects of this invention is to produce a simple and effective construction of bearings and mountings therefor, whereby a supporting element carries one bearing race, and the rotating element carries the other race.

Another object is in the use of such device, the provision of a comparatively permanent lubricating means in an enclosed chamber formed about the bearing by the parts which also form the mounting. This is particularly essential in the use of suction devices of the character referred to, for the reason that the bearings are subjected to extraneous heat, they are unaccessible and usually used by persons unskilled in mechanical arts.

A more specific object therefore, is to so arrange this chamber for the lubricant about the bearings as to prevent the seepage or flow of the lubricant therefrom by gravity or centrifugal force, and to cause centrifugal force to bring the lubricant into contact with the bearing surfaces.

The means for accomplishing the above and other objects will be more fully set forth in the following description which relates to the drawings, and the essential characteristics will be set forth in the claim.

Figure 1:
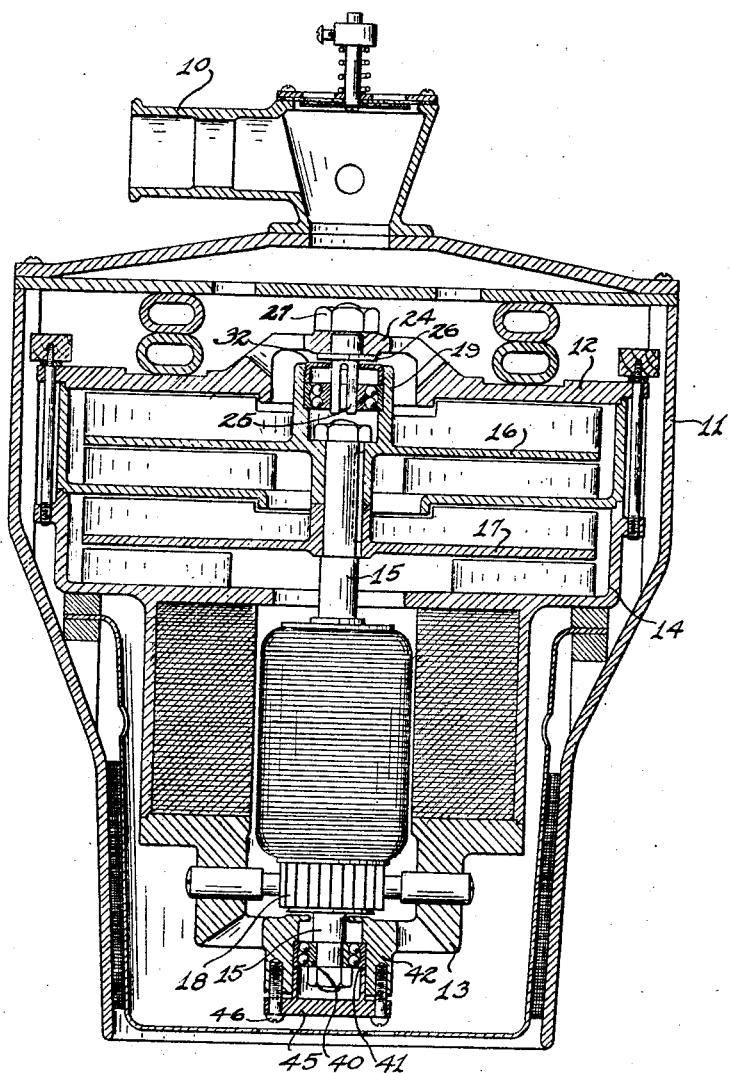
Figure 2:
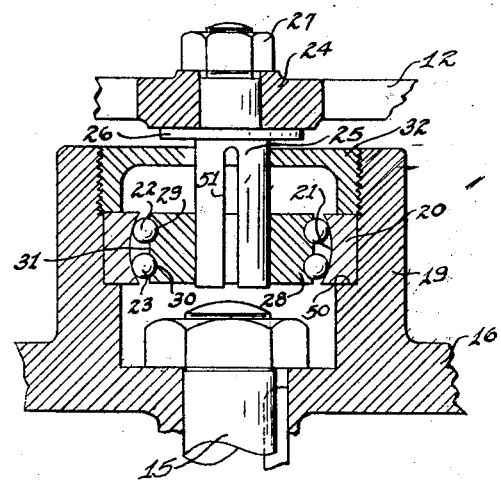
Figure 3:
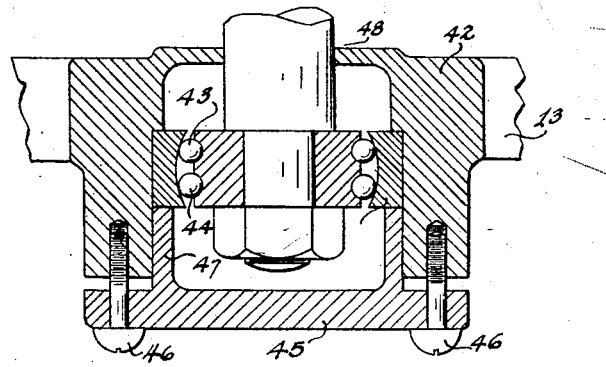

In the drawings Fig. 1 is a longitudinal section taken through a suction producing device embodying the features of my invention; Fig. 2 is an enlarged fragmentary section showing the construction of the top bearing; Fig. 3 is a fragmentary section similar to Fig. 2 showing the construction of the bottom bearing.

My invention contemplates the construction of a bearing which may be adapted for supporting the armature shaft of a vertical motor, and is particularly adapted for high speed motors. Accordingly in Fig. 1, I have shown a preferred embodiment of my invention in connection with a suction producing device embodied in the above mentioned patent. This device is adapted to be inserted within the lower portion of a player piano and to be connected by the tube 10 to the actuating pneumatics of the piano. In general, this suction producing apparatus embodies a motor and fan vertically mounted within the container 11. More specifically the rotary elements are supported by a housing having a cap 12, and a commutator frame 13, which are shown as positioned at the top and bottom respectively of the housing member 14. The armature shaft 15 carries at one end thereof, the fan blades 16—17, and at the other end thereof the commutator 18.

My invention is concerned with the means for supporting the armature shaft 15, which means is embodied in a ball bearing structure, which will now be described. At the top of the shaft 15, and extending upwardly from the upper fan blade 16, I provide a hub 19 which may be recessed and threaded on the interior portion thereof. Within the recess I provide an annular shoulder 50 which is adapted to receive and support an outer ball race or housing 20. This housing 20 is provided with an arcuate ball trackway 21, on the interior periphery thereof, which trackway provides a race for a double set of balls 22—23.

Extending across and above the shaft 15 I may provide an arm 24, which constitutes part of the cap 12 and serves as a supporting medium for a stem 25. This stem may be nonrotatably secured to the arm 24 by means of the collar 26 and the lock nut 27. When the cap 12 is secured to the housing 14, then the stem 25 will be of such length that it enters the recess in the hub 19 and extends somewhat below the center line of the lower set of balls 23. Rigidly secured to the lowermost portion of the stem, I provide a radial bearing ring or inner race 28, which race is provided with two annular ball trackways 29 and 30 with a spacing ridge 31 therebetween. A preferred construction for securing the stem 25 to the inner race is embodied in a slot 51 which is shown as extending upwardly through the stem, and as providing a pair of prongs which are pressed into engagement with the race 28. The arcuate curvature 21 on the outer race 20 provides for slight variation in alignment between the stem 25 and the shaft 15, while the spacing ridge 31 retains the balls in spaced relation within the annular trackway.

Removably secured to the outer portion of the hub I provide a cap 32, which cap comprises a cup-shaped member adapted to cooperate with the threaded portion of the hub 19. The depth of the cup is such that the rim thereof may be brought into abutting engagement with the outer race 20, and be employed for securely retaining such race in position. The space between the cap and the innermost portion of the recess on the hub 19 is adapted to be packed with lubricant, such as grease, and the top of the cap is constructed so as to be in close fitting engagement with the stem 25, whereby lubricant may be retained within the bearing.

The bottom bearing is constructed somewhat similarly to the top bearing with the exception that in the bottom bearing, the inner race 40 is rigidly secured to the shaft 15, and is rotatable therewith, while the outer race 41 is rigid with the arm 42 on the commutator frame 13. The construction of the inner and outer races corresponds to the construction of such races in the top bearing, there being two sets of balls 43 and 44, which are held in spaced relation one above the other.

To secure the outer race 41 to the frame 42, and at the same time to obtain a dust proof lubricant retaining member, I provide a cap 45, which may be secured to the arm 42 by screws 46. The dust cap may have an annular cup shaped portion 47, which is adapted to be held in close fitting engagement with the arm, and to abut the lower portion of the outer race 41. The top of the arm being in close fitting engagement with the shaft 15, as at 48, permits the bottom bearing to be packed with lubricant and to be thereafter sealed.

When the motor is set in operation and the bearing housings are packed with grease, then centrifugal force will cause such lubricant to be thrown outwardly against the side walls of the housing, whereupon the roller bearings will be effectively lubricated at all times. This feature is particularly noticeable in the top bearing where the member 16 is rotated. In the bottom bearing, however, the nut 52 causes a "churning" action which is somewhat similar in effect to the action of the housing member 16 in the top bearing.

I have found that the construction of a bearing such as described provides for self-alignment of the armature shaft in high speed motors, and permits the bearing surfaces to be packed and sealed with sufficient lubricant to prevent overheating of the bearing elements. Furthermore, since the opening between the rotating element and the stationary element is at the top of each lubricant receptacle, it will be seen that a device wherein a vertical shaft is employed is not restricted as to the consistency of the lubricant required.

Having thus described my invention, I claim:

In combination, a vertical motor shaft, a frame comprising a support therefor, a fan blade mounted at one end of the shaft and having a hollow hub projecting beyond the end thereof, a stem extending downwardly from the frame and cooperating with the hub to form an upper bearing for said shaft, said frame having a recess in the bottom thereof, the walls of said recess cooperating with the shaft to form a bottom bearing therefor, and a closure member for each of said recesses.

In testimony whereof, I hereunto affix my signature.

CLINTON H. HANSON.